United States Patent
Park et al.

(10) Patent No.: US 10,243,906 B2
(45) Date of Patent: Mar. 26, 2019

(54) METHOD FOR PROVIDING NOTIFICATION INFORMATION SELECTIVELY AND ELECTRONIC DEVICE THEREOF

(71) Applicant: Samsung Electronics Co., Ltd., Gyeonggi-do (KR)

(72) Inventors: Chan-Pyo Park, Seoul (KR); Sung-Wang Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 14/505,336

(22) Filed: Oct. 2, 2014

(65) Prior Publication Data
US 2015/0095437 A1 Apr. 2, 2015

(30) Foreign Application Priority Data

Oct. 2, 2013 (KR) .................. 10-2013-0117970

(51) Int. Cl.
*H04L 12/58* (2006.01)
(52) U.S. Cl.
CPC .............. *H04L 51/24* (2013.01); *H04L 51/12* (2013.01)
(58) Field of Classification Search
None
See application file for complete search history.

(56) References Cited

U.S. PATENT DOCUMENTS

| | | | |
|---|---|---|---|
| 2004/0219882 A1* | 11/2004 | Laitinen | H04L 29/06 455/41.2 |
| 2006/0010217 A1* | 1/2006 | Sood | H04L 51/12 709/206 |
| 2006/0104423 A1* | 5/2006 | Heidloff | H04L 51/24 379/88.12 |
| 2007/0168519 A1* | 7/2007 | Hayutin | G06Q 10/107 709/227 |
| 2007/0232274 A1* | 10/2007 | Jung | H04M 1/72552 455/412.1 |
| 2008/0188203 A1* | 8/2008 | Vogedes | H04M 1/72522 455/412.2 |
| 2011/0069825 A1* | 3/2011 | Rogson | H04M 1/57 379/142.06 |
| 2011/0125852 A1* | 5/2011 | Wolfe | H04L 12/1827 709/206 |
| 2011/0178962 A1* | 7/2011 | Sood | H04L 51/12 706/11 |
| 2011/0201346 A1* | 8/2011 | Schroeder | H04L 51/14 455/456.1 |
| 2013/0124192 A1* | 5/2013 | Lindmark | G06F 17/274 704/9 |
| 2013/0332721 A1* | 12/2013 | Chaudhri | G06F 3/016 713/100 |
| 2014/0029735 A1* | 1/2014 | Davis | H04M 1/2471 379/88.12 |

(Continued)

*Primary Examiner* — Philip J Chea
*Assistant Examiner* — Hassan A Khan

(57) ABSTRACT

An apparatus and method for providing notification information in an electronic device is provided. The method includes receiving a message when a message reception notification is limited. The method also includes providing a reception notification for the message selectively based on one or more of sender information of the message and whether the message includes notification setting information or not.

14 Claims, 15 Drawing Sheets

(56) References Cited

U.S. PATENT DOCUMENTS

| | | | |
|---|---|---|---|
| 2014/0095144 A1* | 4/2014 | Singh | G06F 11/3013 704/2 |
| 2014/0289644 A1* | 9/2014 | Clarke | H04L 51/34 715/752 |
| 2015/0293592 A1* | 10/2015 | Cheong | G06F 3/016 345/173 |

* cited by examiner

METHOD FOR PROVIDING NOTIFICATION INFORMATION SELECTIVELY AND ELECTRONIC DEVICE THEREOF

PRIORITY

The present application is related to and claims priority under 35 U.S.C. § 119 to an application filed in the Korean Intellectual Property Office on Oct. 2, 2013 and assigned Serial No. 10-2013-0117970, the contents of which are incorporated herein by reference.

TECHNICAL FIELD

Exemplary embodiments of the present disclosure relate to an apparatus and method for providing notification information selectively in an electronic device.

BACKGROUND

With the development of information communication technology and semiconductor technology, various kinds of electronic devices can provide various multimedia services. For example, the electronic device is able to provide multimedia services such as a voice communication service, a video communication service, a message service, a broadcasting service, a wireless Internet service, a camera service, a music playback service, and the like.

The message service can include a Short Message Service (SMS) for transmitting a message of a simple text, a Long Message Service (LMS) for transmitting a message of a long text, a Multimedia Message Service (MMS) for transmitting a message including a multimedia file such as an image, a moving image, and the like, and an instant message.

SUMMARY

As the use of the message service in an electronic device increases as described above, a side effect caused by exchange of messages increases. For example, a message reception notification sound ringing in public places such as an office, a theater, and public transport can cause noise pollution to other people.

To address the above-discussed deficiencies, it is a primary object to provide an apparatus and method for limiting a notification on message reception in an electronic device.

In a first example, a method is provided. The method includes providing a message reception notification selectively based on message sender information in an electronic device.

In a second example, an apparatus is provided. The apparatus is configured to provide a message reception notification selectively based on message sender information in an electronic device.

In a third example a method is provided. The method includes providing a message reception notification selectively based on notification setting information in an electronic device.

In a fourth example, an apparatus is provided. The apparatus is configured to provide a message reception notification selectively based on notification setting information in an electronic device.

In a fifth example a method is provided. The method includes providing a message reception notification selectively based on message sender information and notification setting information in an electronic device.

In a sixth example, an apparatus is provided. The apparatus is configured to provide a message reception notification selectively based on message sender information and notification setting information in an electronic device.

In a seventh example, a method is provided. The method includes providing a message reception notification selectively based on message sender information and a notification phrase in an electronic device.

In an eighth example, an apparatus is provided. The apparatus is configured to provide a message reception notification selectively based on message sender information and a notification phrase in an electronic device.

In a ninth example, a method is provided. The method includes providing a message reception notification selectively during a reference time in an electronic device.

In a tenth example, an apparatus is provided. The apparatus is configured to provide a message reception notification selectively during a reference time in an electronic device.

In an eleventh example, a method is provided. The method includes providing a message reception notification selectively based on location information in an electronic device.

In a twelfth example, an apparatus is provided. The apparatus is configured to provide a message reception notification selectively based on location information in an electronic device.

In a thirteenth example a method is provided. The method includes providing notification information in an electronic device includes when a message reception notification is limited. The method also includes receiving a message. The method further includes providing a reception notification for the message selectively based on one or more of sender information of the message and whether the message includes notification setting information or not.

In a fourteenth example an electronic device is provided. The electronic device includes a communicator. The electronic device also includes a processor configured to provide a reception notification for a message received via the communicator selectively based on one or more of sender information of the message and whether the message includes notification setting information or not. The electronic device can be used when a message reception notification is limited.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
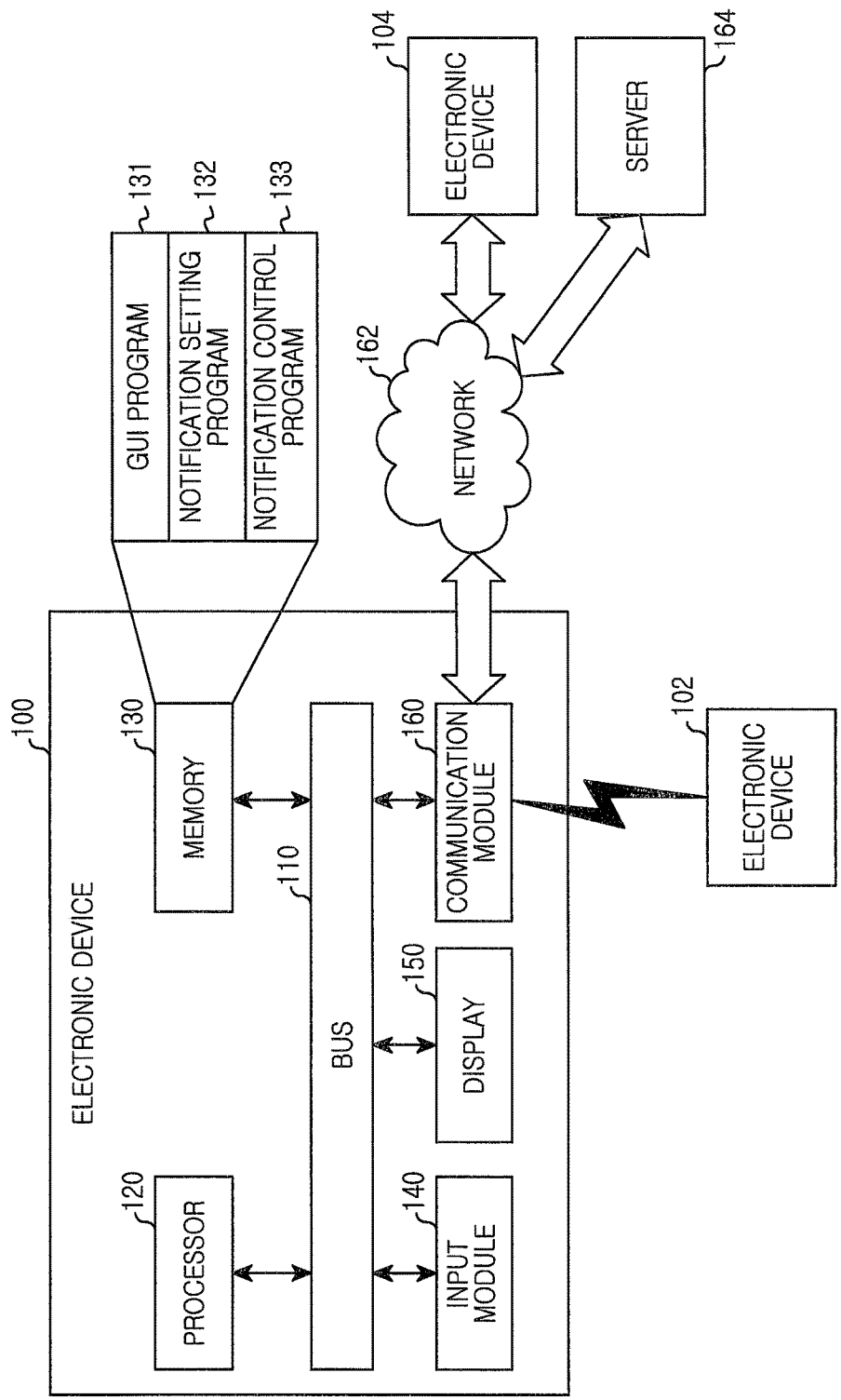
FIG. 1 is a block diagram of an example electronic device according to this disclosure.

FIGS. 1 through 12C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of this disclosure will be described herein below with reference to the accompanying drawings. Although specific embodiments of this disclosure are illustrated in the drawings and relevant detailed descriptions are provided, various changes can be made to the exemplary embodiments and various exemplary embodiments may be provided. Accordingly, the various exemplary embodiments of the this disclosure are not limited to the specific embodiments and should be construed as including all changes and/or equivalents or substitutes included in the ideas and technological scopes of the exemplary embodiments of the this disclosure. In the explanation of the drawings, similar reference numerals are used for similar elements.

The term "include" or "may include" used in the exemplary embodiments of the this disclosure indicates the presence of disclosed corresponding functions, operations, elements, and the like, and does not limit additional one or more functions, operations, elements, and the like In addition, it should be understood that the term "include" or "has" used in the exemplary embodiments of the this disclosure is to indicate the presence of features, numbers, steps, operations, elements, parts, or a combination thereof described in the specifications, and does not preclude the presence or addition of one or more other features, numbers, steps, operations, elements, parts, or a combination thereof.

The term "or" or "at least one of A or/and B" used in the various exemplary embodiments of the this disclosure includes any and all combinations of the associated listed items. For example, the term "A or B" or "at least one of A or/and B" may include A, B, or all of A and B.

Although the terms such as "first" and "second" used in the various exemplary embodiments of the this disclosure may modify various elements of the various exemplary embodiments, these terms do not limit the corresponding elements. For example, these terms do not limit an order and/or importance of the corresponding elements. These terms may be used for the purpose of distinguishing one element from another element. For example, a first user device and a second user device all indicate user devices or may indicate different user devices. For example, a first element may be named as a second element without departing from the right scope of the various exemplary embodiments of the present disclosure, and similarly, a second element may be named as a first element.

It will be understood that when an element is "connected" or "coupled" to another element, the element may be directly connected or coupled to the another element, and there may be another new element between the element and the another element. To the contrary, it will be understood that when an element is "directly connected" or "directly coupled" to another element, there is no other element between the element and the another element.

The terms used in the various exemplary embodiments of this disclosure are for the purpose of describing particular exemplary embodiments only and are not intended to be limiting. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various exemplary embodiments of the present disclosure is equipped with a notification function. For example, the electronic device can include at least one of a smartphone, a tablet PC, a mobile phone, a video phone, an electronic book reader, a desktop PC, a laptop PC, a net book computer, a Personal Digital Assistant (PDA), a Portable Multimedia Player (PMP), an MP3 player, a mobile medical machine, a camera, and a wearable device (for example, a Head-Mounted-Device (HMD) such as electronic glasses, electronic clothing, an electronic bracelet, an electronic necklace, an electronic accessory, an electronic tattoo, or a smart watch).

The electronic device can be a smart home appliance which is equipped with a notification function. For example, the smart home appliance can include at least one of a television, a Digital Versatile Disk (DVD) player, a stereo, a refrigerator, an air conditioner, a cleaner, an oven, a microwave oven, a washing machine, an air cleaner, a set-top box, a TV box (for example, Samsung HomeSync™, Apple TV™, or Goggle TV™), a game console, an electronic dictionary, an electronic key, a camcorder, and an electronic album.

The electronic device can include at least one of various medical machines (for example, Magnetic Resonance Angiography (MRA), Magnetic Resonance Imaging (MRI), Computerized Tomography (CT), a tomograph, an ultrasound machine, and the like), a navigation device, a Global Positioning System (GPS) receiver, an Event Data Recorder (EDR), a Flight Data Recorder (FDR), an automotive infotainment device, an electronic equipment for ship (for example, a navigation equipment for ship, a gyro compass, and the like), an airline electronic device, a security device, a head unit for a car, an industrial or home service robot, an Automated Teller Machine (ATM) of a financial institution, and a Point-Of-Sales (POS) of a store, which are equipped with a notification function.

The electronic device can include at least one of a part of furniture or a building/a structure equipped with a notification function, an electronic board, an electronic signature input device, a projector, and various measurement devices (for example, water, power, gas, radio waves, and the like). The electronic device can be one or a combination of one or more of the above-mentioned devices. In addition, the electronic device can be a flexible device. In addition, it is obvious to an ordinary skilled person in the related art that the electronic device according to various exemplary embodiments of this disclosure is not limited to the above-mentioned devices.

Hereinafter, a technology for providing notification information selectively in an electronic device will be explained.

FIG. 1 illustrates a block configuration of an example electronic device according to this disclosure.

Referring to FIG. 1, the electronic device 100 includes a bus 110, a processor 120, a memory 130, an input module 140, a display 150, and a communication module 160. One or more of the processor 120 and the memory 130 can exist in plural number.

The bus 110 connects the elements included in the electronic device 100 to one another and controls communication between the elements included in the electronic device 100.

The processor 120 controls the electronic device 100 to provide various services. For example, the processor 120 deciphers an instruction received from one or more of the other elements included in the electronic device 100 (such as the memory 130, the input module 140, the display 150, communication module 160) via the bus 110, and executes an operation or data processing according to the deciphered instruction.

The processor 120 controls the electronic device 100 to provide various services by executing one or more programs stored in the memory 130.

Figure 11A:
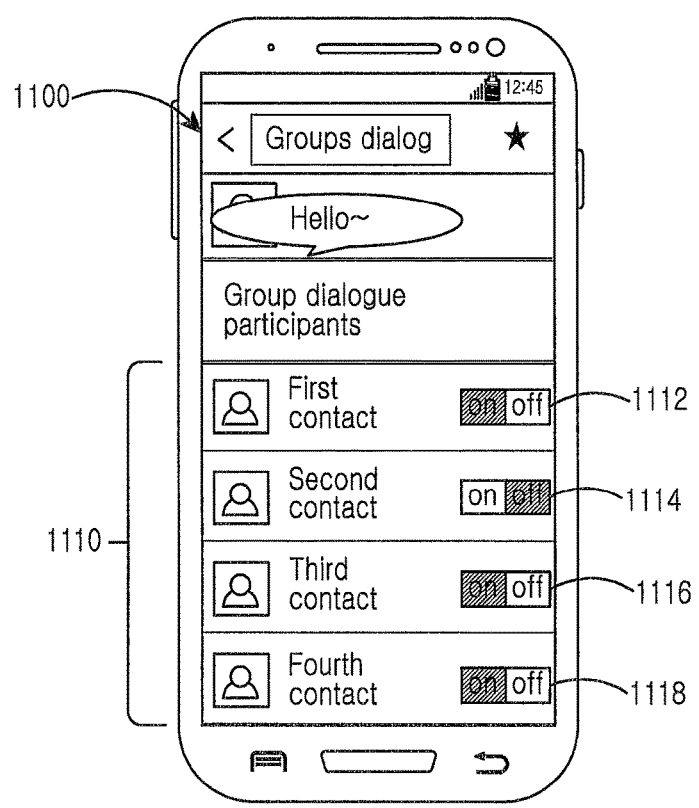
FIGS. 11A and 11B are views illustrating example screen configurations for setting a notification providing list in an electronic device according to this disclosure.

The processor 120 sets one or more of a list of other electronic devices and notification setting information for providing a message reception notification by executing a notification setting program 132 stored in the memory 130. For example, when a message reception notification setting event occurs during a group chat 1100 as shown in FIG. 11A, the processor 120 controls to display a list of participants 1110 of the group chat on the display 150. In this case, the processor 120 determines whether to set a reception notification for each participant of the group chat (1112, 1114, 1116, and 1118) based on input information provided via the input module 140.

Figure 11B:
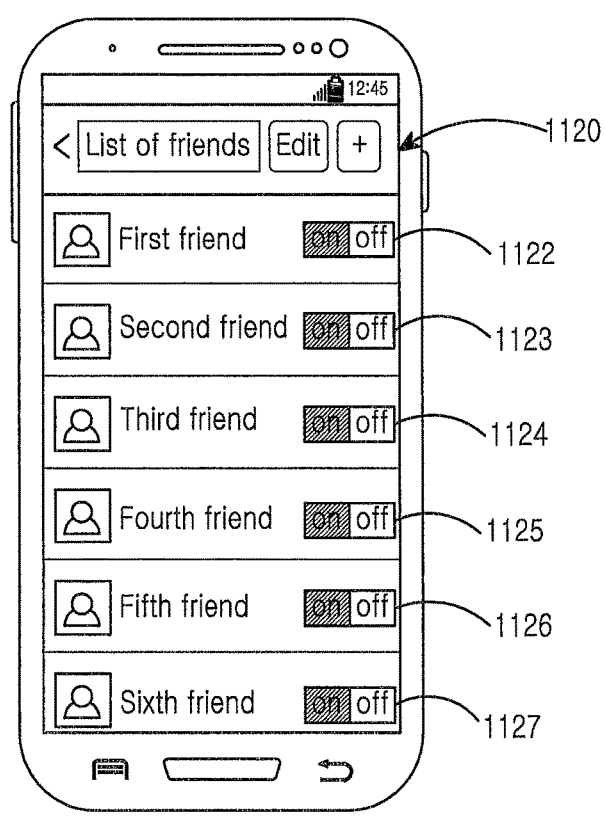

When a message reception notification setting event occurs, the processor 120 controls to display a list of friends 1120 stored in the memory 130 on the display 150 as shown in FIG. 11B. In this case, the processor 120 determines whether to set a reception notification for each friend (1122 to 1127) based on input information provided via the input module 140.

Figure 12A:
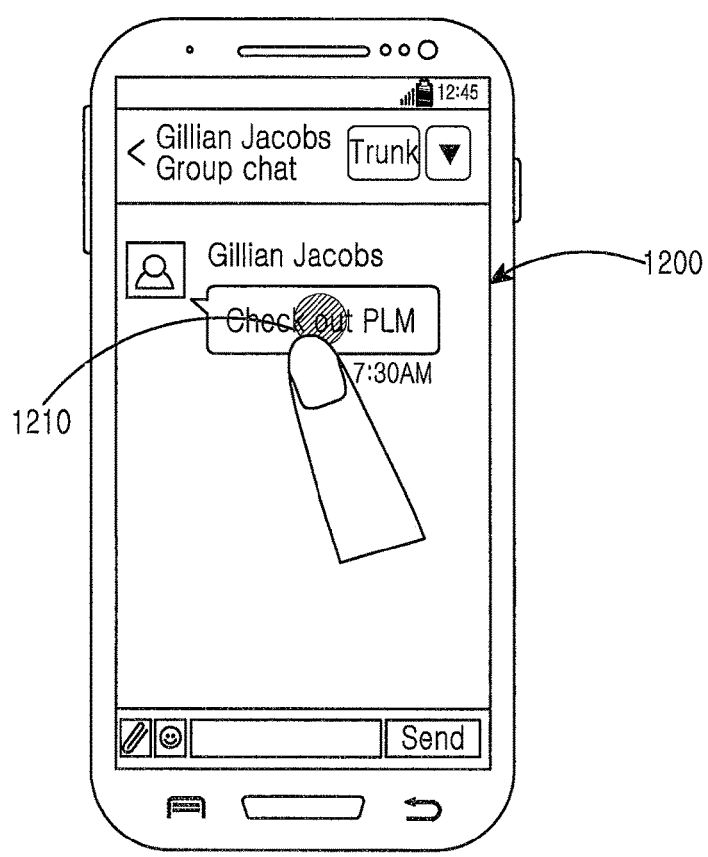
FIGS. 12A to 12C are views illustrating example screen configurations for setting a notification phrase in an electronic device according to this disclosure.
Figure 12B:
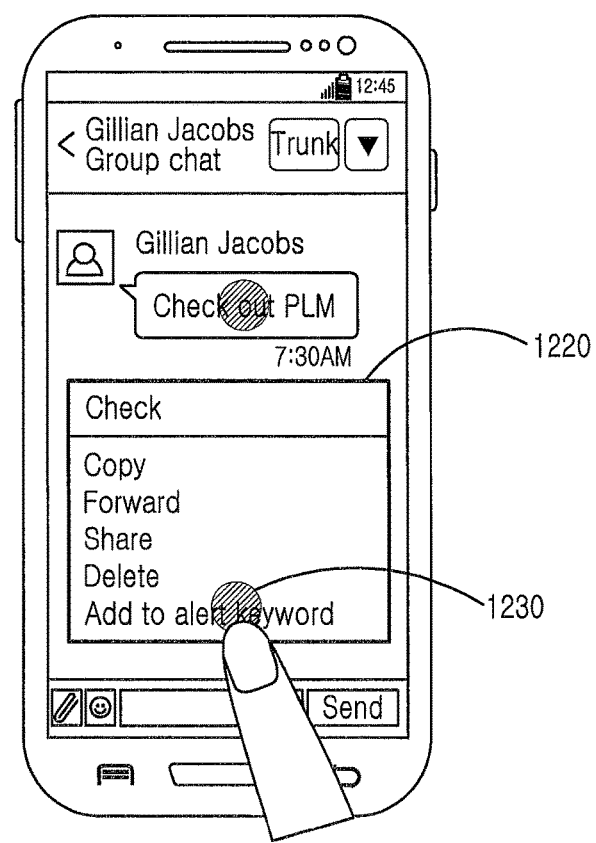
Figure 12C:
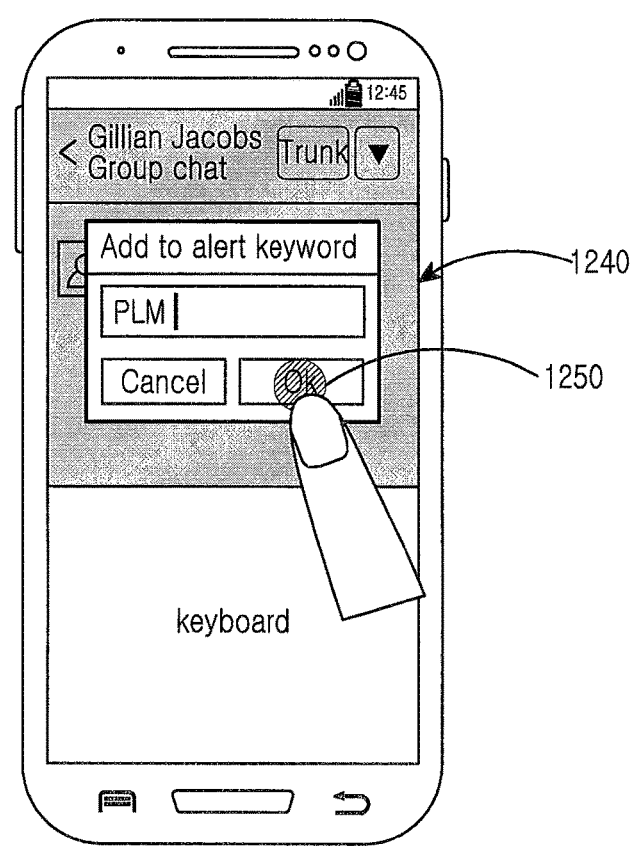

When a user touches a phrase of a specific location and keeps touching for a reference time while using a messenger service 1200 with one or more of other electronic devices as shown in FIG. 12A (1210), the processor 120 controls to display a control menu 1220 regarding the touched phrase on the display 150 as shown in FIG. 12B. When a touch on a notification phrase menu is sensed (such as element 1230 in FIG. 12B), the processor 120 displays a notification phrase setting screen 1240 on the display 150 as shown in FIG. 12C and sets the touched phrase as a notification phrase for providing a message reception notification. In this case, the processor 120 edits the phrase displayed on the notification phrase setting screen 1240 based on input information provided via the input module 140. In addition, the processor 120 sets the phrase which is displayed on the notification phrase setting screen 1240 at the time that an "OK" menu of the notification phrase setting screen 1240 is selected as the notification phrase for providing the message reception notification.

When a notification phrase setting event occurs, the processor 120 controls to display the notification phrase setting screen 1240 on the display 150 as shown in FIG. 12C. In this case, the processor 120 displays the notification phrase setting screen 1240 based on input information provided via the input module 140. In addition, the processor 120 sets the phrase which is displayed on the notification phrase setting screen 1240 at the time that the "OK" menu (1250) of the notification phrase setting screen 1240 is selected as the notification phrase for providing the message reception notification.

The processor 120 provides a message reception notification selectively by executing a notification control program 133 stored in the memory 130. For example, when a notification function on message reception is limited, the processor 120 provides the message reception notification selectively based on message sender information. That is, when the reception notification is set for a first electronic device of other electronic devices in the state in which the message reception notification is limited, the processor 120 provides the message reception notification for a message received from the first electronic device. In this case, the processor 120 provides the message reception notification selectively according to whether a reception notification is set for each of other electronic devices in a group chat in which the message reception notification function is limited.

When the notification function on the message reception is limited, the processor 120 provides the message reception notification selectively according to whether a received message includes notification setting information or not. That is, the processor 120 provides the reception notification for the message including the notification setting information in the state in which the message reception notification is limited. In this case, the processor 120 provides the message reception notification selectively according to whether a message received from other electronic devices during a group chat in which the message reception notification function is limited includes the notification setting information. The notification setting information can include one or more of a sentence form for notifying reception, a question mark, a notification phrase, and a user name of the electronic device 100.

When the notification function on the message reception is limited, the processor 120 provides the message reception notification selectively according to the message sender information and whether the received message includes the notification setting information. In this case, the processor 120 provides the message reception notification selectively according to whether a reception notification is set for each of other electronic devices in a group chat in which the message reception notification function is limited and whether the received message includes the notification setting information or not.

When the notification function on the message reception is limited, the processor 120 provides the message reception notification selectively during a reference time based on one or more of the message sender information and whether the received message includes the notification setting information or not.

When the notification function on the message reception is limited, the processor 120 provides the message reception notification selectively in a reference location based on one or more of the message sender information and whether the received message includes the notification setting information or not.

The memory 130 stores an instruction or data which is received from one or more elements included in the electronic device 100 (the processor 120, the input module 140, the display 150, the communication module 160) or generated by one or more elements.

The memory 130 stores one or more programs for services of the electronic device 100. For example, the memory 130 can include one or more of a Graphic User Interface (GUI) program 131, a notification setting program 132, and a notification control program 133.

The GUI program 131 includes at least one software element for providing a user interface to the display 150 in graphics. For example, the GUI program 131 controls to display information on an application program driven by the processor 120 on the display 150.

The notification setting program 132 includes at least one software element for setting one or more of a list of electronic devices and notification setting information for providing a message reception notification.

The notification control program 133 includes at least one software element for providing the message reception notification selectively. For example, when a notification function on message reception is limited, the notification control program 133 provides the message reception notification selectively based on one or more of message sender information and whether a received message includes notification setting information or not. In another example, when the notification function on the message reception is limited, the notification control program 133 provides the message reception notification selectively during a reference time based on one or more of the message sender information and whether the received message includes notification the setting information or not. In yet another example, when the notification function on the message reception is limited, the notification control program 133 provides the message reception notification selectively in a reference location based on one or more of the message sender information and whether the received message includes the notification setting information or not.

The input module 140 transmits an instruction or data which is generated by a user selection to the processor 120 or the memory 130 via the bus 110. For example, the input module 140 includes one or more of a keypad including at least one hardware button and a touch panel for sensing touch information.

The display 150 can display an image, a video, or data for the user. For example, the display 150 displays information on an application program which is driven by the processor 120.

The communication module 160 connects communication between at least one different electronic device 102 or 104, a server 164, or at least one peripheral and the electronic device 100. For example, the communication module 160 can support a short-range communication protocol (such as Wireless Fidelity (Wifi), Bluetooth (BT), Near Field Communication (NFC)), a network communication protocol 262 (such as Internet, Local Area Network (LAN), Wire Area Network (WAN), telecommunication network, cellular network, satellite network or Plain Old Telephone Service (POTS)), or a wired communication protocol (such as Universal Serial Bus (USB), High Definition Multimedia Interface (HDMI)). In this case, the communication protocol (such as the short-range communication protocol, the network communication protocol, and the wired communication network) can be supported via middleware of the memory 130 or an Application Programming Interface (API). Herein, the different electronic device 102 or 104 can include the same type of device as the electronic device 100 or a different type of device as a peripheral of the electronic device 100.

In the above-described exemplary embodiment, the processor 120 provides the message reception notification selectively by executing software elements stored in the memory 130 in a single module.

Figure 2:
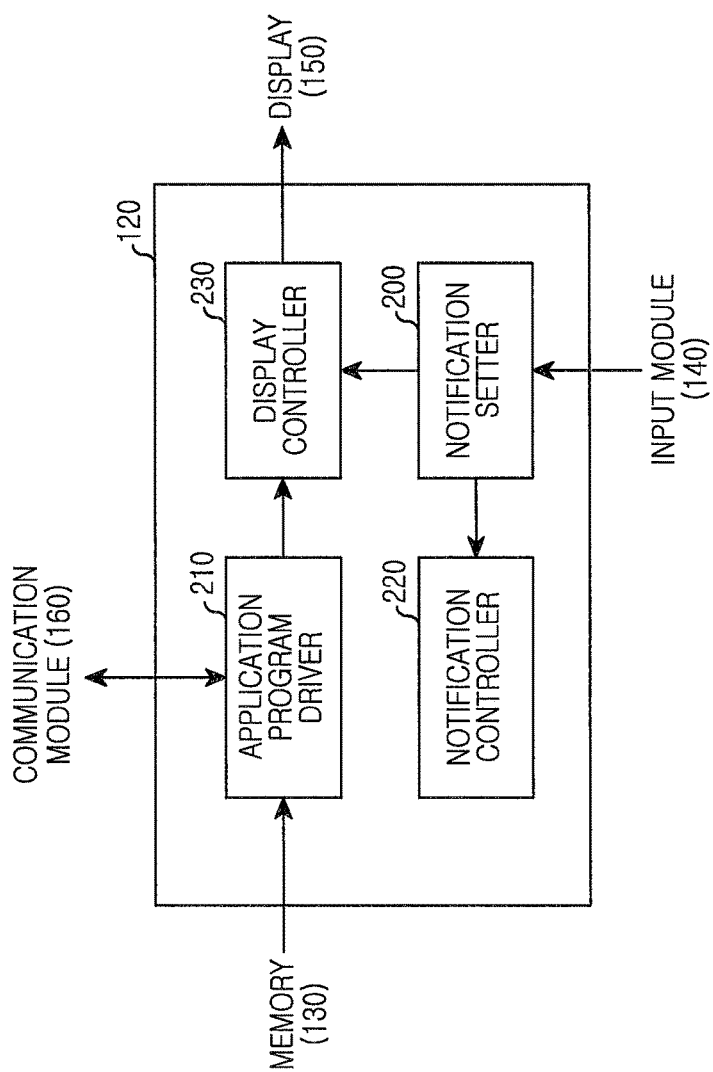
FIG. 2 is a detailed block diagram of an example processor according to this disclosure.

In an embodiment, the processor 120 includes elements for providing a message reception notification selectively as separate modules as shown in FIG. 2.

FIG. 2 illustrates a detailed block configuration of an example processor according to this disclosure.

Referring to FIG. 2, the processor 120 includes a notification setter 200, an application program driver 210, a notification controller 220, and a display controller 230.

The notification setter 200 sets one or more of a list of other electronic devices and notification setting information for providing a message reception notification. In this case, the notification setter 200 sets one or more of the list of other electronic devices and the notification setting information for providing the message reception notification by executing the notification setting program 132 stored in the memory 130. For example, when a message reception notification setting event occurs during a group chat 1100 as shown in FIG. 11A, the notification setter 200 displays a list of participants 1110 of the group chat on the display 150 through the display controller 230. In this case, the notification setter 200 determines whether to set a reception notification for each participant in the group chat (1112 to 1118) based on input information provided via the input module 140.

When a message reception notification setting event occurs, the notification setter 200 displays a list of friends 1120 stored in the memory 130 on the display 150 through the display controller 230 as shown in FIG. 11B. In this case, the notification setter 200 determines whether to set a reception notification for each friend (1122 to 1127) based on input information provided via the input module 140.

When the user touches a phrase of a specific location and keeps touching for a reference time while using a messenger service 1200 with one or more of other electronic devices as shown in FIG. 12A (1210), the notification setter 200 displays a control menu 1220 regarding the touched phrase on the display 150 through the display controller 230 as shown in FIG. 12B. When a touch on a notification phrase menu is sensed (1230), the notification setter 200 displays a notification phrase setting screen 1240 on the display 150 through the display controller 230 as shown in FIG. 12C and sets the touched phrase as a notification phrase for providing the message reception notification. In this case, the notification setter 200 edits the phrase displayed on the notification phrase setting screen 1240 based on input information provided via the input module 140. In addition, the notification setter 200 sets the phrase which is displayed on the notification phrase setting screen 1240 at the time that an "OK" menu of the notification phrase setting screen 1240 is selected as the notification phrase for providing the message reception notification.

When a notification phrase setting event occurs, the notification setter 200 displays the notification phrase setting screen 1240 on the display 150 through the display controller 230 as shown in FIG. 12C. In this case, the notification setter 200 displays the notification phrase setting screen 1240 based on input information provided via the input module 140. In addition, the notification setter 200 sets the phrase which is displayed on the notification phrase setting screen 1240 at the time that the "OK" menu of the notification phrase setting screen 1240 is selected as the notification phrase for providing the message reception notification.

The application program driver 210 provides a service according to a corresponding application program by executing at least one application program stored in the memory 130. For example, the application program driver 210 provides a messenger service by driving a message application program. In this case, the application program driver 210 provides the message reception notification selectively under control of the notification controller 220.

The notification controller 220 controls the application program driver 210 to provide the message reception notification selectively. In this case, the notification controller 220 executes the notification control program 133 stored in the memory 130 and may control the application program driver 210 to provide the message reception notification selectively. For example, when a notification function on message reception is limited, the notification controller 220 controls the application program driver 210 to provide the message reception notification selectively based on message sender information. That is, when the reception notification is set for a first electronic device of other electronic devices in the state in which the message reception notification is limited, the notification controller 220 controls the application program driver 210 to provide the message reception notification for a message received from the first electronic device. In this case, the notification controller 220 controls to provide the message reception notification selectively according to whether a reception notification is set for each of other electronic devices in a group chat in which the message reception notification function is limited.

When the notification function on the message reception is limited, the notification controller 220 controls the application program driver 210 to provide the message reception notification selectively according to whether a received message includes notification setting information or not. That is, the notification controller 220 controls the application program driver 210 to provide the reception notification for the message including the notification setting information in the state in which the message reception notification is limited. In this case, the notification controller 220 controls the application program driver 210 to provide the message reception notification selectively according to whether a message received from other electronic devices during a group chat in which the message reception notification function is limited includes the notification setting information. The notification setting information can include one or more of a sentence form for notifying reception, a question mark, a notification phrase, and a user name of the electronic device 100.

When the notification function on the message reception is limited, the notification controller 220 controls the application program driver 210 to provide the message reception notification selectively according the message sender information and whether the received message includes the notification setting information or not. In this case, the notification controller 220 controls the application program driver 210 to provide the message reception notification selectively according to whether a reception notification is set for each of other electronic devices in a group chat in which the message reception notification function is limited and whether the received message includes the notification setting information or not.

When the notification function on the message reception is limited, the notification controller 220 controls the application program driver 210 to provide the message reception notification selectively during a reference time based on one or more of the message sender information and whether the received message includes the notification setting information or not.

When the notification function on the message reception is limited, the notification controller 220 controls the application program driver 210 to provide the message reception notification selectively in a reference location based on one or more of the message sender information and whether the received message includes the notification setting information or not.

The display controller 230 controls to provide a user interface to the display 150 in graphics. In this case, the display controller 230 controls to provide the user interface to the display 150 in graphics by executing the GUI program 131 stored in the memory 130. For example, the display controller 230 controls to display a messenger service screen on the display 150 while providing a messenger service through the application program driver 210. When a message reception notification setting event occurs during the messenger service, the display controller 230 controls to display a list of participants 1110 of a group chat on the display 150 as shown in FIG. 11A. In another example, when the message reception notification setting event occurs, the display controller 230 controls to display a list of friends 1120 stored in the memory 130 on the display 150 as shown in FIG. 11B. In another example, when the user touches a phrase of a specific location and keeps touching for a reference time while using a messenger service through the application program driver 210 (1210) as shown in FIG. 12A, the display controller 230 controls to display a control menu 1220 regarding the touched phrase on the display 150 as shown in FIG. 12B. When a touch on a notification phrase menu is sensed (1230), the display controller 230 controls to display a notification phrase setting screen 1240 on the display 150 as shown in FIG. 12C. In another example, when a notification phrase setting event occurs, the display controller 230 controls to display the notification phrase setting screen 1240 on the display 150 as shown in FIG. 12C. In this case, the display controller 230 controls to display a screen for setting one or more of a list of other electronic devices and notification setting information for providing the message reception notification in response to a request of the notification setter 200 on the display 150.

In the above-described exemplary embodiment, the electronic device 100 provides the message reception notification selectively by using the processor 120.

In an embodiment, the electronic device can include a separate control module for providing a message reception notification selectively.

Figure 3:
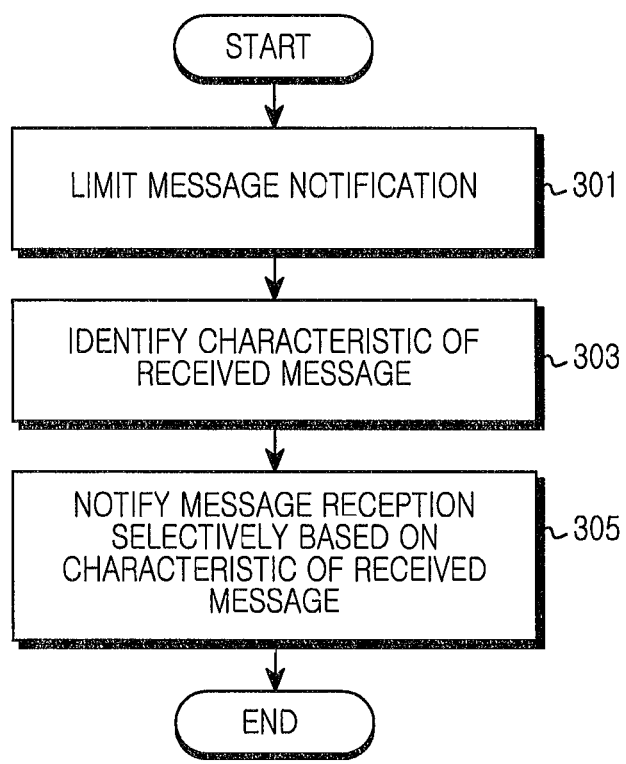
FIG. 3 is a view illustrating an example procedure for providing a message reception notification selectively in an electronic device according to this disclosure.

FIG. 3 illustrates an example procedure for providing a message reception notification selectively in an electronic device according to this disclosure.

Referring to FIG. 3, the electronic device limits a message notification function in step 301. For example, the electronic device limits a message notification function regarding a messenger service based on input information provided via the input module 140. In another example, the electronic device limits a message notification function regarding a specific group chat based on input information provided via the input module 140. In another example, the electronic device limits a message notification function in the electronic device based on input information provided via the input module 140.

When the message notification function is limited, the electronic device identifies a characteristic of a message received from other electronic devices in step 303. For example, the electronic device identifies a characteristic of a message sender which transmitted a message. In another example, the electronic device determines whether the received message includes notification setting information or not. The notification setting information can include one or more of a sentence form for notifying reception, a question mark, a notification phrase, and a user name of the electronic device 100.

In step 305, the electronic device selectively generates a message reception notification event based on the characteristic of the received message. For example, when the reception notification is set for a first electronic device of other electronic devices, which is a message sender, the electronic device provides the message reception notification for a message received from the first electronic device in the state in which the message notification function is limited. In another example, when the received message includes the notification setting information, the electronic device provides the reception notification of the corresponding message in the state in which the message notification function is limited. In another example, when the reception notification is set for the first electronic device, which is the message sender, and the message received from the first electronic device includes the notification setting information, the electronic device provides the message reception notification for the message received from the first electronic device in the state in which the message notification function is limited. Herein, the message reception notification can include one or more of a message reception information display, a message reception notification sound generation, and a vibration generation.

Figure 4:
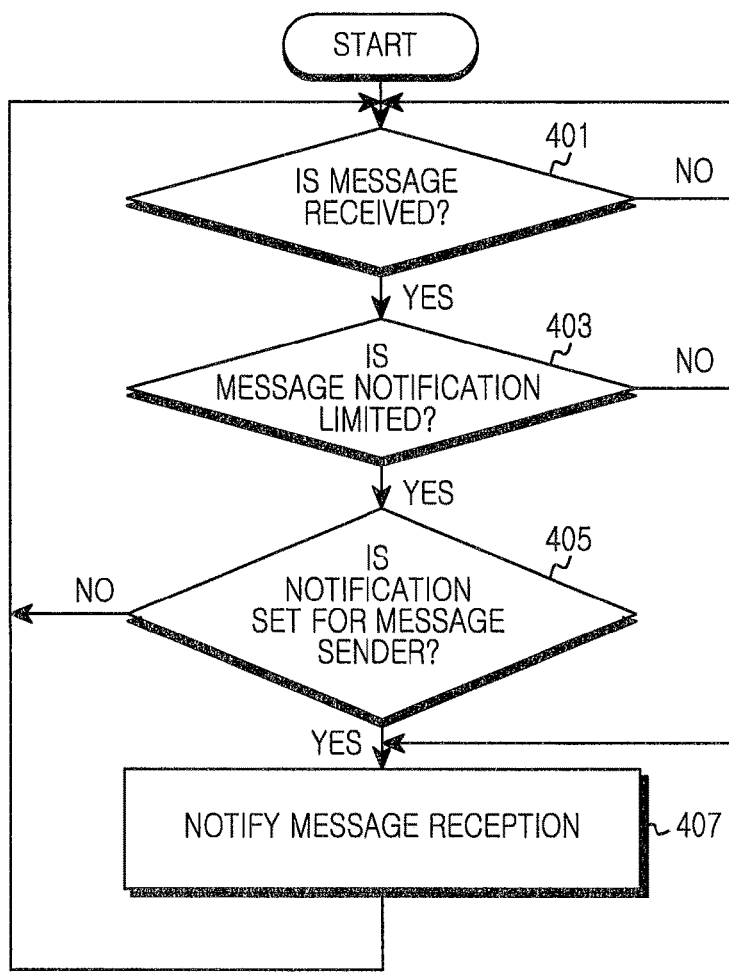
FIG. 4 is a view illustrating an example procedure for providing a message reception notification selectively based on message sender information in an electronic device according to this disclosure.

FIG. 4 illustrates an example procedure for providing a message reception notification selectively based on message sender information in an electronic device according to this disclosure.

Referring to FIG. 4, the electronic device determines whether a message is received from other electronic devices or not in step 401.

When the message is received, the electronic device determines whether a message notification function is limited or not in step 403. For example, the electronic device determines whether a message notification function for a corresponding group is limited or not when chatting in a group including other electronic devices.

When the message notification function is not limited, the electronic device generates a message reception notification event in response to the message being received in step 407. For example, the electronic device can generate the message reception notification event including one or more of a message reception information display, a message reception notification sound generation, and a vibration generation for notifying message reception.

When the message notification function is limited in step 403, the electronic device determines whether the reception notification function is set for a message sender in step 405. For example, the electronic device determines whether the sender of the message received in step 401 is included in a list of other electronic devices for providing the message reception notification.

When the reception notification function is not set for the message sender, the electronic device may not generate the message reception notification event according to the message notification function limitation. Thereafter, the electronic device resumes step 401 to determine whether a message is received or not.

When the reception notification function is set for the message sender in step 405, the electronic device may generate the message reception notification event in step 407. For example, when the reception notification is set for a first electronic device of other electronic devices, which is the message sender, the electronic device provides the message reception notification for the message received from the first electronic device in the state in which the message notification function is limited.

Figure 5:
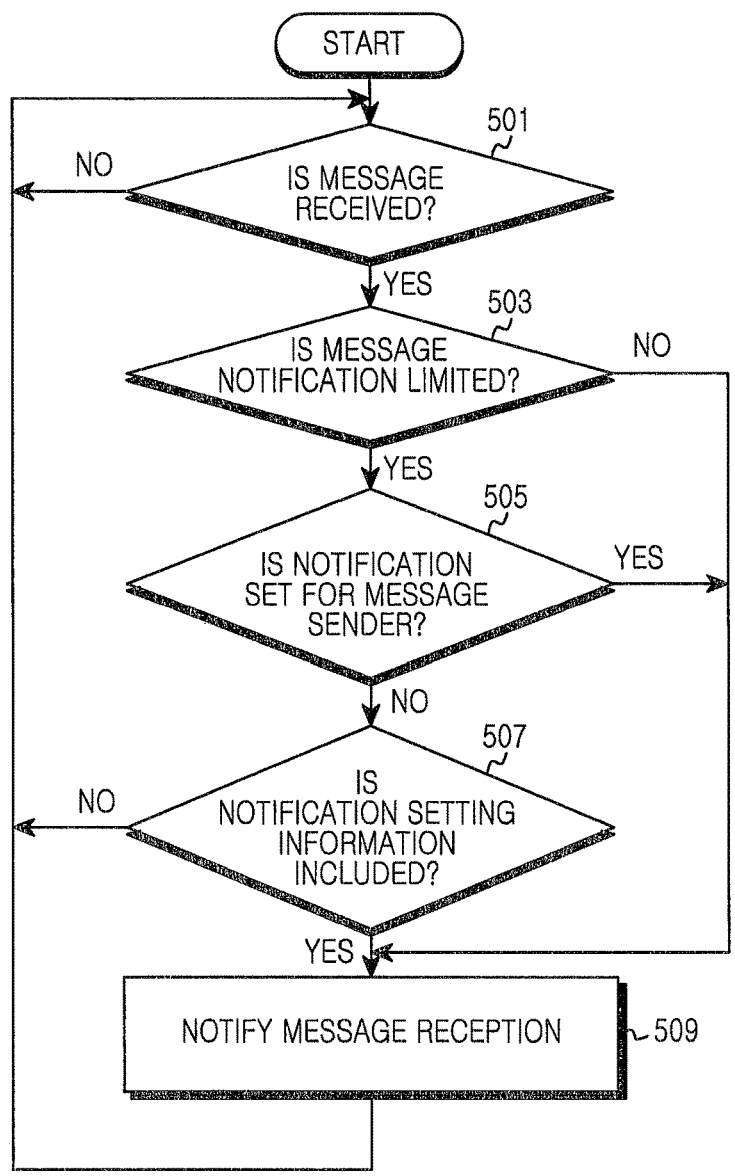
FIG. 5 is a view illustrating an example procedure for providing a message reception notification selectively based on notification setting information in an electronic device according to this disclosure.

FIG. 5 illustrates an example procedure for providing a message reception notification selectively based on notification setting information in an electronic device according to this disclosure.

Referring to FIG. 5, the electronic device determines whether a message is received from other electronic devices or not in step 501.

When the message is received, the electronic device determines whether a message notification function is limited or not in step 503. For example, the electronic device determines whether a message notification function for a corresponding group is limited or not when chatting in a group including other electronic devices.

When the message notification function is not limited, the electronic device generates a message reception notification event in response to the message being received in step 509. For example, the electronic device can generate the message reception notification event including one or more of a message reception information display, a message reception notification sound generation, and a vibration generation for notifying message reception.

When the message notification function is limited in step 503, the electronic device determines whether a reception notification function is set for a message sender in step 505. For example, the electronic device can determine whether the sender of the message received in step 501 is included in a list of other electronic devices for providing the message reception notification.

When the reception notification function is set for the message sender, the electronic device generates the message reception notification event in step 509. For example, when the reception notification is set for a first electronic device of other electronic devices, which is the message sender, the electronic device provides the message reception notification for a message received from the first electronic device in the state in which the message notification function is limited.

On the other hand, when the reception notification function is not set for the message sender, the electronic device determines whether the message received from the other electronic devices includes notification setting information or not in step 507. For example, the electronic device determines whether the received message includes a sentence form for notifying reception. In another example, the electronic device determines whether the received message includes a notification phrase. In another example, the electronic device determines whether the received message includes a punctuation mark (such as a question mark) related to a question. In another example, the electronic device determines whether the received message includes a user name of the electronic device or not.

When the received message does not include the notification setting information, the electronic device may not generate the message reception notification event according to the message notification function limitation. Thereafter, the electronic device resumes step 501 to determine whether a message is received or not.

When the received message includes the notification setting information in step 507, the electronic device generates the message reception notification event in step 509. For example, when the received message includes the notification setting information, the electronic device provides the reception notification of the corresponding message in the state in which the message notification function is limited.

In the above-described exemplary embodiment, the electronic device provides the message reception notification selectively based on a sentence form of the received message. For example, when the received message includes an interrogative sentence in view of English grammar, such as "verve be+subject", "auxiliary verb+subject", "interrogative+verb+subject", "interrogative+verb", "mediated expression+interrogative clause", and "declarative sentence+verb+personal pronoun," the electronic device provides the message reception notification even in the state in which the message notification function is limited. When the text of the received message is not English, the electronic device translates the received message into English and identifies the sentence form.

Figure 6:
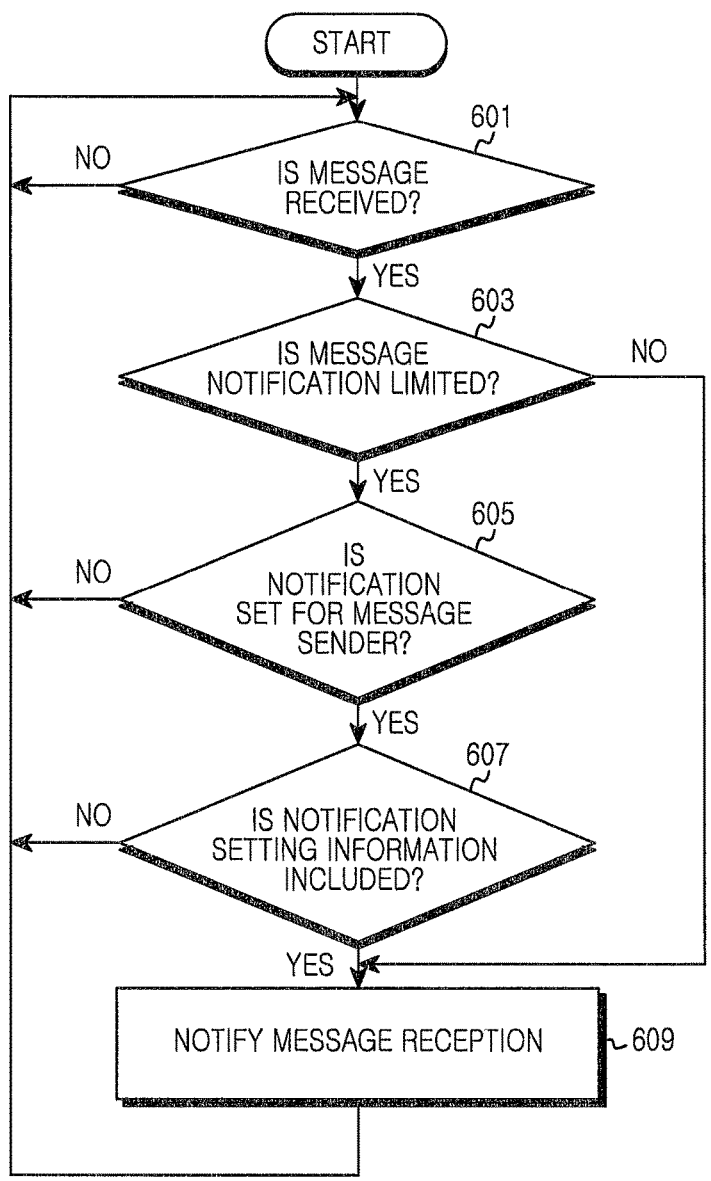
FIG. 6 is a view illustrating an example procedure for providing a message reception notification selectively based on notification setting information in an electronic device according to this disclosure.

FIG. 6 illustrates an example procedure for providing a message reception notification selectively based on notification setting information in an electronic device according to this disclosure.

Referring to FIG. 6, the electronic device determines whether a message is received from other electronic devices or not in step 601.

When the message is received, the electronic device determines whether a message notification function is limited or not in step 603. For example, the electronic device determines whether a message notification function for a corresponding group is limited or not when chatting in a group including other electronic devices.

When the message notification function is not limited, the electronic device generates a message reception notification event in response to the message being received in step 609. For example, the electronic device can generate the message reception notification event including one or more of a message reception information display, a message reception notification sound generation, and a vibration generation for notifying message reception.

When the message notification function is limited in step 603, the electronic device determines whether a reception notification function is set for a message sender or not in step 605. For example, the electronic device determines whether the sender of the message received in step 601 is included in a list of other electronic devices for providing the message reception notification.

When the reception notification function is not set for the message sender, the electronic device may not generate the message reception notification event according to the message notification function limitation. Thereafter, the electronic device resumes step 601 to determine whether a message is received or not.

When the reception notification function is set for the message sender in step 605, the electronic device determines whether the received message includes notification setting information or not in step 607. For example, the electronic device determines whether the received message includes a sentence form for notifying reception. In another example, the electronic device determines whether the received message includes a notification phrase. In another example, the electronic device determines whether the received message includes a punctuation mark (such as a question mark) related to a question. In another example, the electronic device determines whether the received message includes a user name of the electronic device or not.

When the received message does not include the notification setting information, the electronic device may not generate the message reception notification event according to the message notification function limitation. Thereafter, the electronic device resumes step 601 to determine whether a message is received or not.

When the received message includes the notification setting information in step 607, the electronic device generates the message reception notification event in step 609. For example, when the reception notification is set for a first electronic device of other electronic devices, which is the message sender, and a message received from the first electronic device includes notification setting information, the electronic device provides the message reception notification for the message received from the first electronic device in the state in which the message notification function is limited.

In the above-described exemplary embodiment, the electronic device provides the message reception notification service selectively according to whether the message received from other electronic devices for which the reception notification is set includes the notification setting information or not.

In an embodiment, when a received message includes notification setting information, the electronic device provides a message reception notification service selectively by determining whether a reception notification is set for other electronic devices which transmitted a message.

Figure 7:
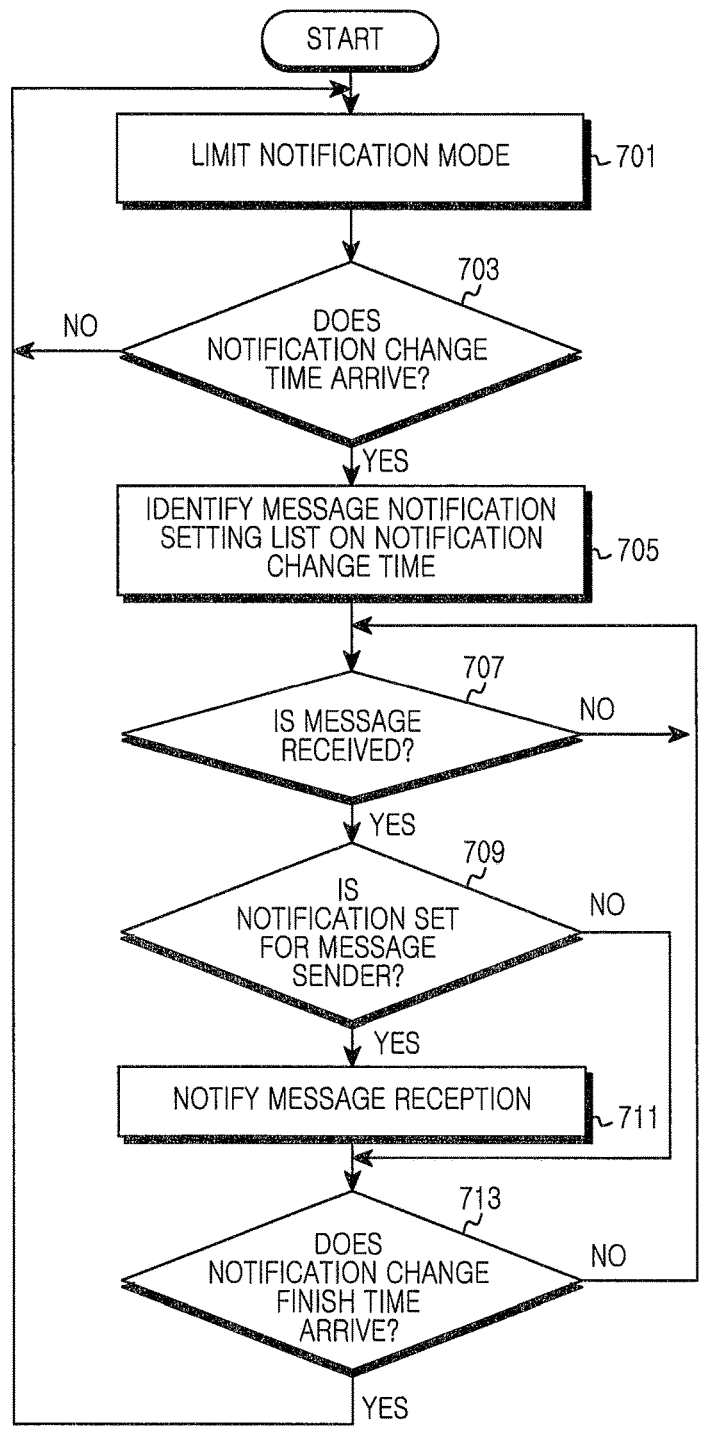
FIG. 7 is a view illustrating an example procedure for providing a message reception notification based on time information in an electronic device according to this disclosure.

FIG. 7 illustrates an example procedure for providing a message reception notification selectively based on time information in an electronic device according to this disclosure.

Referring to FIG. 7, the electronic device limits a message notification function in step 701. For example, the electronic device limits a message notification function regarding a messenger service based on input information provided via the input module 140. In another example, the electronic device limits a message notification function in the electronic device based on input information provided via the input module 140.

When the message notification function is limited, the electronic device determines whether a notification change time arrives or not in step 703. For example, the electronic device determines whether a selection notification event occurs or not based on time information.

When the notification change time does not arrive, the electronic device resumes step 701 to limit the message notification function. That is, the electronic device does not generate a notification event in response to a message being received.

When the notification change time arrives in step 703, the electronic device identifies a message notification setting list on the notification change time in step 705. The notification setting list includes a list of other electronic devices for providing a message reception notification during a reference time in the state in which a message notification function is limited.

Thereafter, the electronic device determines whether a message is received or not in step 707.

When the message is received, the electronic device determines whether a reception notification is set for a message sender in step 709. For example, the electronic device determines whether the message sender is included in the notification setting list or not.

When the reception notification is not set for the message sender, the electronic device may not generate the message reception notification event according to the message notification function limitation. Thereafter, the electronic device determines whether a notification change finish time arrives or not in step 713.

When the reception notification is set for the message sender in step 709, the electronic device generates the message reception notification event in step 711. For example, when the reception notification is set for a first electronic device of other electronic devices, which is the message sender, the electronic device provides the message reception notification for a message received from the first electronic device during the reference time in the state in which the message notification function is limited.

Thereafter, the electronic device determines whether the notification change finish time arrives or not in step 713.

When the notification change finish time does not arrive, the electronic device resumes step 707 to determine whether a message is received or not.

When the notification change finish time arrives in step 713, the electronic device resumes step 701 to limit the message notification function. That is, the electronic device does not generate the notification event in response to a message being received.

In the above-described embodiment, the electronic device provides a notification on reception of a message from other electronic devices included in the notification setting list during the reference time. For example, when the user sets business hours in the office as a reference time, the electronic device sets the notification setting list to include information on one or more of other electronic devices related to business during the reference time (such as business hours). Accordingly, the electronic device provides a reception notification for a message received from one or more of other electronic devices related to the business during the reference time (such as business hours).

Figure 8:
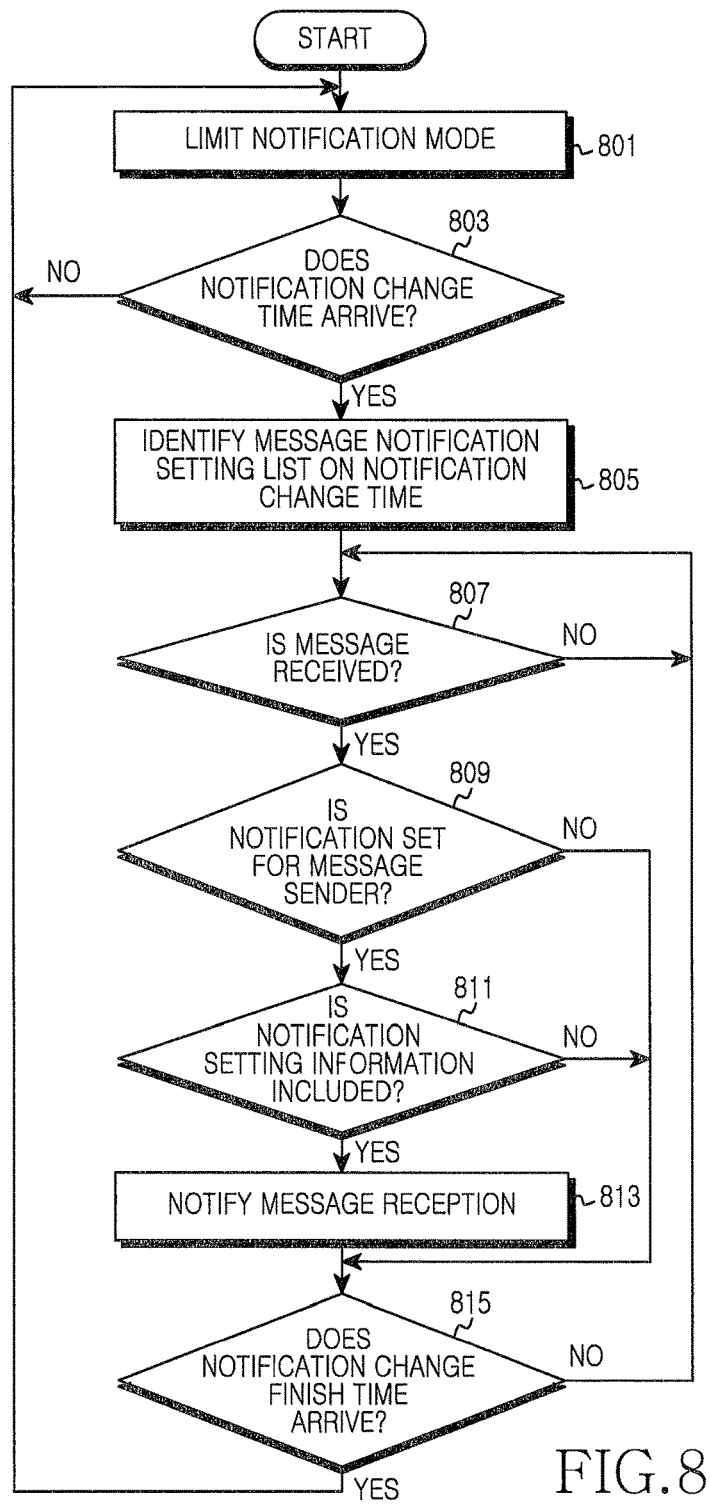
FIG. 8 is a view illustrating an example procedure for providing a message reception notification selectively based on time information in an electronic device according to another this disclosure.

FIG. 8 illustrates an example procedure for providing a message reception notification selectively based on time information in an electronic device according to this disclosure.

Referring to FIG. 8, the electronic device limits a message notification function in step 801. For example, the electronic device limits a message notification function regarding a messenger service based on input information provided via the input module 140. In another example, the electronic device limits a message notification function in the electronic device based on input information provided via the input module 140.

When the message notification function is limited, the electronic device determines whether a notification change time arrives or not in step 803.

When the notification change time does not arrive, the electronic device resumes step 801 to limit the message notification function. That is, the electronic device does not generate a notification event in response to a message being received.

When the notification change time arrives in step 803, the electronic device identifies a message notification setting list on the notification change time in step 805. The notification setting list includes a list of other electronic devices and notification setting information for providing a message reception notification during a reference time in the state in which the message notification function is limited.

Thereafter, the electronic device determines whether a message is received or not in step 807.

When the message is received, the electronic device determines whether a reception notification is set for a message sender in step 809. For example, the electronic device determines whether the message sender is included in the notification setting list or not.

When the reception notification is not set for the message sender, the electronic device may not generate the message reception notification event according to the message notification function limitation. Thereafter, the electronic device determines whether a notification change finish time arrives or not in step 815.

When the reception notification is set for the message sender in step 809, the electronic device determines whether the received message includes notification setting information or not in step 811. For example, the electronic device determines whether the received message includes a sentence form for notifying reception. In another example, the electronic device determines whether the received message includes a notification phrase. In another example, the electronic device determines whether the received message includes a punctuation mark (such as a question mark) related to a question. In another example, the electronic device determines whether the received message includes a user name of the electronic device or not.

When the received message does not include the notification setting information, the electronic device may not generate the message reception notification event according to the message notification function limitation. Thereafter, the electronic device determines whether the notification change finish time arrives or not in step 815.

When the received message includes the notification setting information in step 811, the electronic device generates the message reception notification event in step 813. For example, when the reception notification is set for a first electronic device of other electronic devices, which is the message sender, and a message received from the first electronic device includes notification setting information, the electronic device provides the message reception notification for the message received from the first electronic device in the state in which the message notification function is limited.

Thereafter, the electronic device determines whether the notification change finish time arrives or not in step 815.

When the notification change finish time does not arrive, the electronic device resumes step 807 to determine whether a message is received or not.

When the notification change finish time arrives in step 815, the electronic device resumes step 801 to limit the message notification function. That is, the electronic device does not generate the notification event in response to a message being received.

In the above-described embodiment, the electronic device provides a notification on reception of a message from other electronic devices included in the notification setting list during the reference time. For example, when the user sets business hours in the office as a reference time, the electronic device sets the notification setting list to include information on one or more of other electronic devices related to business during the reference time (such as business hours). Accordingly, the electronic device provides a reception notification for a message received from one or more of other electronic devices related to the business during the reference time (such as business hours).

Figure 9:
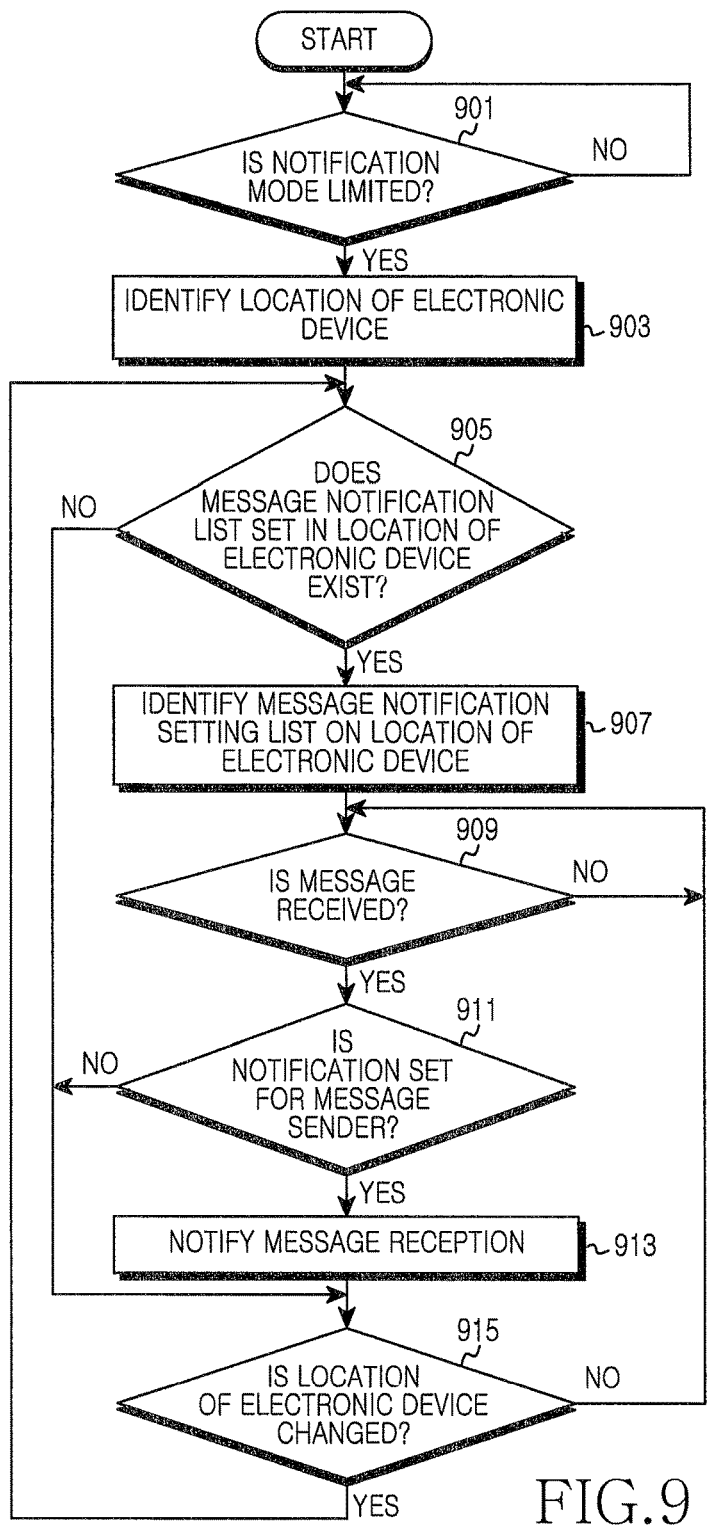
FIG. 9 is a view illustrating an example procedure for providing a message reception notification selectively based on location information in an electronic device according to this disclosure.

FIG. 9 illustrates an example procedure for providing a message reception notification selectively based on location information in an electronic device according to this disclosure.

Referring to FIG. 9, the electronic device determines whether a message notification function is limited in step 901. For example, the electronic device determines whether a message notification function regarding a messenger service is limited or not based on input information provided via the input module 140. In another example, the electronic device determines whether a message notification function in the electronic device is limited or not based on input information provided via the input module 140.

When the message notification function is limited, the electronic device identifies a current location of the electronic device in step 903. For example, the electronic device estimates a current location by using a satellite reception module. In another example, the electronic device estimates the current location based on triangulation.

In step 905, the electronic device determines whether message notification setting list information for the current location of the electronic device exists. For example, the electronic device determines whether a selection notification event occurs or not according to whether the message notification setting list set in the location information exists. The notification setting list includes a list of other electronic devices for providing a message reception notification in a reference area in the state in which the message notification function is limited.

When the message notification setting information for the current location of the electronic device does not exist, the electronic device recognizes that the electronic device does not provide the selective message notification service in the current location. Thereafter, the electronic device determines whether the location of the electronic device is changed or not in step 915.

When the message notification setting information for the current location of the electronic device exists in step 905, the electronic device recognizes that the electronic device provides the selective message notification service in the current location. Accordingly, the electronic device identifies the message notification setting list set in the current location in step 907.

The electronic device determines whether a message is received or not in step 909.

When the message is received, the electronic device determines whether a reception notification is set for a message sender or not in step 911. For example, the electronic device determines whether the message sender is included in the notification setting list or not.

When the reception notification is not set for the message sender, the electronic device does not generate the message reception notification event according to the message notification function limitation. Thereafter, the electronic device determines whether the location of the electronic device is changed or not in step 915.

When the reception notification is set for the message sender in step 911, the electronic device generates the message reception notification event in step 913. For example, when the reception notification is set for a first electronic device of other electronic devices, which is the message sender, the electronic device provides the message reception notification for a message received from the first electronic device while the electronic device is located in a reference section in the state in which the message notification function is limited. The reference section includes an area where the selective message notification service is provided according to the message notification setting list identified in step 907.

The electronic device determines whether the location of the electronic device is changed or not in step 915. For example, the electronic device determines whether the electronic device leaves from the reference section.

When the location of the electronic device is not changed, the electronic device resumes step 909 to determine whether a message is received or not.

When the location of the electronic device is changed and the electronic device leaves from the reference section in step 915, the electronic device resumes step 905 to determine whether a message notification setting list for a current location of the electronic device exists or not.

In the above-described embodiment, the electronic device determines whether to provide the selective message notification service according to whether the message notification setting list information for the current location of the electronic device exists or not.

In an embodiment, the electronic device determines whether the electronic device enters an area where the selective message notification service is activated or not according to location information of the electronic device.

In the above-described embodiment, when a notification setting list including information on one or more of other electronic devices related to business in an office is set, the electronic device provides the reception notification for a message received from one or more of other electronic devices related to the business while being located in the reference section (such as an office).

Figure 10:
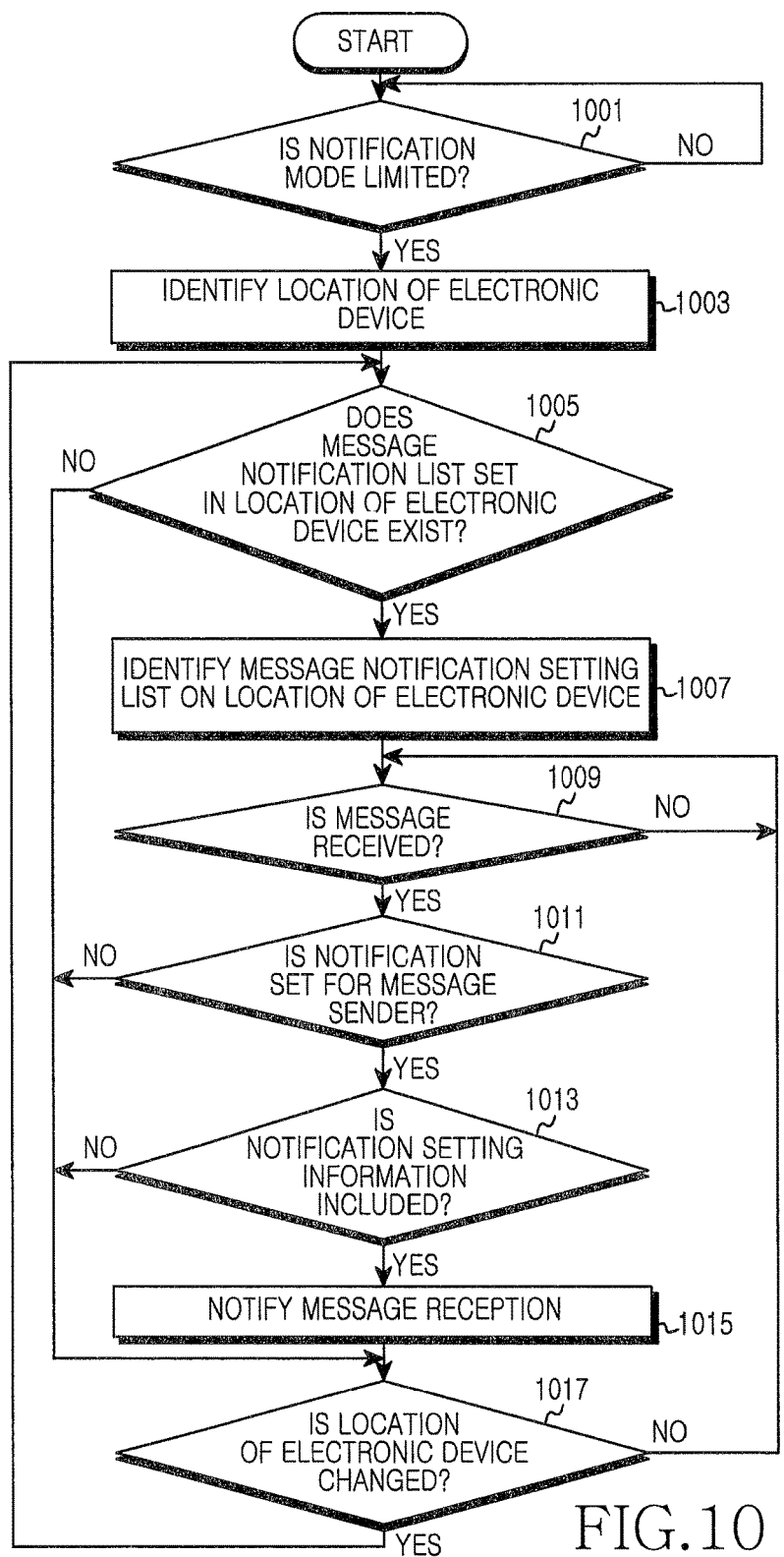
FIG. 10 is a view illustrating an example procedure for providing a message reception notification selectively based on location information in an electronic device according to this disclosure.

FIG. 10 illustrates an example procedure for providing a message reception notification selectively based on location information in an electronic device according to this disclosure.

Referring to FIG. 10, the electronic device determines whether a message notification function is limited or not in step 1001. For example, the electronic device determines whether a message notification function regarding a messenger service is limited or not based on input information provided via the input module 140. In another example, the electronic device determines whether a message notification function in the electronic device is limited or not based on input information provided via the input module 140.

When the message notification function is limited, the electronic device identifies a current location of the electronic device in step 1003. For example, the electronic device estimates a current location by using a satellite reception module. In another example, the electronic device estimates the current location based on triangulation.

Thereafter, in step 1005, the electronic device determines whether message notification setting list information for the current location of the electronic device exists. The notification setting list includes a list of other electronic devices and notification setting information for providing the message reception notification in a reference area in the state in which the message notification function is limited.

When the message notification setting list information for the current location of the electronic device does not exist, the electronic device recognizes that the electronic device does not provide the selective message notification service in the current location. Thereafter, the electronic device determines whether the location of the electronic device is changed or not in step 1017.

When the message notification setting list information for the current location of the electronic device exists in step 1005, the electronic device recognizes that the electronic device provides the selective message notification service in the current location. Accordingly, the electronic device identifies the message notification setting list set in the current location in step 1007.

The electronic device determines whether a message is received or not in step 1009.

When the message is received, the electronic device determines whether a reception notification is set for a message sender or not in step 1011. For example, the electronic device determines whether the message sender is included in the notification setting list or not.

When the reception notification is not set for the message sender, the electronic device does not generate the message reception notification event according to the message notification function limitation. Thereafter, the electronic device determines whether the location of the electronic device is changed or not in step 1017.

When the reception notification is set for the message sender in step 1011, the electronic device determines whether the received message includes the notification setting information or not in step 1013. For example, the electronic device determines whether the received message includes a sentence form for notifying reception. In another example, the electronic device determines whether the received message includes a notification phrase. In another example, the electronic device determines whether the received message includes a punctuation mark (such as a question mark) related to a question. In another example, the electronic device determines whether the received message includes a user name of the electronic device or not.

When the received message does not include the notification setting information, the electronic device may not generate the message reception notification event corresponding to the message notification function limitation. Thereafter, the electronic device determines whether the location of the electronic device is changed in step 1017.

When the received message includes the notification setting information in step 1013, the electronic device generates the message reception notification event in step 1015. For example, when the reception notification is set for a first electronic device of other electronic devices, which is the message sender, and a message received from the first electronic device includes the notification setting information, the electronic device provides the message reception notification for the message received from the first electronic device in the state in which the message notification function is limited.

The electronic device determines whether the location of the electronic device is changed or not in step 1017. For example, the electronic device determines whether the electronic device leaves from the reference section.

When the location of the electronic device is not changed, the electronic device resumes step 1009 to determine whether a message is received or not.

When the location of the electronic device is changed and the electronic device leaves from the reference section in step 1017, the electronic device resumes step 1005 to determine whether a message notification setting list for a current location of the electronic device exists or not.

In the above-described embodiment, the electronic device determines whether to provide the selective message notification service according to whether the message notification setting list information for the current location of the electronic device exists or not.

The electronic device determines whether the electronic device enters an area where a selective message notification service is activated or not according to location information of the electronic device.

When a notification setting list including information on one or more of other electronic devices related to business in the office is set and business-related information is set as notification setting information, the electronic device provides the reception notification for a business-related message received from one or more of other electronic devices related to the business while being located in the reference section (such as an office).

Methods based on the embodiments disclosed herein can be implemented in hardware, software, or a combination of both.

When implemented in software, computer readable recording medium for storing one or more programs (such as software modules) can be provided. The one or more programs stored in the computer readable recording medium are configured for execution performed by one or more processors in an electronic device. The one or more programs include instructions for allowing the electronic device to execute the methods based on the embodiments disclosed in the claims and/or specification of the present disclosure.

The program (such as the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access via an external port to the electronic device.

In addition, an additional storage device on a communication network may access to a portable electronic device.

As described above, since a message reception notification is selectively provided based at least one of message sender information and a notification phrase in an electronic device, an unnecessary message reception notification can be limited and reception of an important message can be recognized by a user.

In addition, since an electronic device provides a message reception notification selectively based on at least one of time and location in an electronic device, an unnecessary message reception notification at a specific time and a specific location can be limited and reception of an important message can be recognized by a user.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method for use in an electronic device, the method comprising:
    during a group chat with at least one other electronic device, receiving a message from the at least one other electronic device, wherein a message reception notification regarding the group chat is restricted;
    in response to receiving the message, identifying notification setting information for selectively providing the message reception notification in a state in which the message reception notification is restricted, wherein the notification setting information comprises a notification phrase or word for selectively providing the message reception notification; and
    providing a message reception notification for the received message if the received message includes the notification phrase or word for selectively providing the message reception notification,
    if a touch input for a phrase or word in the group chat for predetermined time is maintained, displaying a first window for providing a plurality of menus associated with the phrase or word overlappingly with a group chat window for the group chat, the plurality of menus comprise a menu for adding the phrase or word to the notification phrase or word,
    in response to a touch input for the menu, displaying concurrently a second window for editing the phrase or word and a virtual keyboard, the second window comprising an edit field and an approval menu for adding an edited phrase or word to the notification phrase or word,
    in response to a touch input for the approval menu, setting a phrase or word that is displayed in the edit field as the notification phrase or word.

2. The method of claim 1, wherein the notification setting information further comprises information on a pre-set form of one or more sentences for selectively providing the message reception notification.

3. The method of claim 2, wherein providing the message reception notification for the message if the message includes the notification phrase or word for selectively providing the message reception notification:
    determining whether the message comprises at least one sentence with the pre-set form; and
    when the message comprises the at least one sentence with the pre-set form, providing the message reception notification for the message.

4. The method of claim 3, further comprising, when the message does not comprise at least one sentence with the pre-set form, restricting the message reception notification for the message.

5. The method of claim 3, wherein providing the message reception notification for the message comprises outputting at least one of message reception information, a message reception sound, or a vibration.

6. An electronic device comprising:
    a display;
    a communicator configured to during a group chat with at least one other electronic device, receive a message from the at least one other electronic device, wherein a message reception notification regarding the group chat is restricted; and
    a hardware processor configured to:
        in response to receiving the message, identify notification setting information for selectively providing the message reception notification in a state in which the message reception notification is restricted, wherein the notification setting information comprises a notification phrase or word for selectively providing the message reception notification; and
        provide a message reception notification for the received message if the received message includes the notification phrase or word for selectively providing the message reception notification,
    if a touch input for a phrase or word in the group chat for predetermined time is maintained, control the display to display a first window for providing a plurality of menus associated with the phrase or word overlappingly with a group chat window for the group chat, the plurality of menus comprise a menu for adding the phrase or word to the notification phrase or word,
    in response to a touch input for the menu, control the display to display concurrently a second window for editing the phrase or word and a virtual keyboard, the second window comprising an edit field and an approval menu for adding an edited phrase or word to the notification phrase or word,
    in response to a touch input for the approval menu, set a phrase or word that is displayed in the edit field as the notification phrase or word.

7. The electronic device of claim 6, wherein the notification setting information further comprises information on a pre-set form of one or more sentences for selectively providing the message reception notification.

8. The electronic device of claim 7, wherein, when the message comprises at least one sentence with the pre-set form, the hardware processor is configured to provide the message reception notification for the message.

9. The electronic device of claim 8, wherein, when the message does not comprise at least one sentence with the pre-set form, the hardware processor is configured to restrict the message reception notification for the message.

10. The electronic device of claim 6, wherein the electronic device includes at least one of a smartphone, a tablet personal computer (PC), a mobile phone, a video phone, an electronic book reader, a desktop PC, a laptop PC, a net book computer, a personal digital assistant (PDA), a portable multimedia player (PMP), an MP3 player, a mobile medical machine, a camera, a wearable device, an appliance, or a medical machine.

11. The method of claim 1, wherein if message reception notification setting event occur during the group chat, a list of participants of the group chat is displayed, and selective providing of the message reception notification for each participant of the group chat is set based on a user input for the displayed list of the participants.

12. The method of claim 1, wherein the edited phrase or word is a phrase or word in which at least one character is deleted in the phrase or word touched by the touch input.

13. The method of claim 3, wherein the determining whether the message comprises at least one sentence with the pre-set form comprises, if a language of the message is non-English language, translating the message to English, determining whether the message comprises at least one sentence with the pre-set form using the translated message.

14. The method of claim 1, wherein the virtual keyboard enables user to edit the phrase or word in the edit field.

* * * * *